(12) United States Patent
Clarke

(10) Patent No.: US 9,851,562 B2
(45) Date of Patent: Dec. 26, 2017

(54) EMBEDDED GRATING STRUCTURE

(75) Inventor: Roger Clarke, Royston (GB)

(73) Assignee: The Technology Partnership PLC, Melbourn, Royston, Herts (GB)

( * ) Notice: Subject to any disclaimer, the term of this patent is extended or adjusted under 35 U.S.C. 154(b) by 842 days.

(21) Appl. No.: 13/640,012

(22) PCT Filed: Apr. 8, 2011

(86) PCT No.: PCT/GB2011/000551
§ 371 (c)(1),
(2), (4) Date: Dec. 5, 2012

(87) PCT Pub. No.: WO2011/124897
PCT Pub. Date: Oct. 13, 2011

(65) Prior Publication Data
US 2013/0107366 A1    May 2, 2013

(30) Foreign Application Priority Data
Apr. 9, 2010   (GB) .................................. 1005964.0

(51) Int. Cl.
*G02B 5/18*      (2006.01)
*G02B 27/01*     (2006.01)

(52) U.S. Cl.
CPC ....... G02B 27/0172 (2013.01); G02B 5/1866 (2013.01); G02B 27/0101 (2013.01); *G02B 2027/0178* (2013.01); *G02B 2027/0194* (2013.01)

(58) Field of Classification Search
CPC ............ G02B 27/0172; G02B 27/0101; G02B 5/1866; G02B 27/017; G02B 27/0037; G02B 27/4211; G02B 27/4277; G02B 5/1876; G02B 2027/0123; G02B 2027/0143
USPC ........ 359/563–571, 574–576, 630–634, 641, 359/712, 742, 741; 353/38; 351/159.11; 369/112.08
See application file for complete search history.

(56) References Cited

U.S. PATENT DOCUMENTS

| | | | |
|---|---|---|---|
| 4,220,400 A * | 9/1980 | Vizenor | G02B 27/0172 2/424 |
| 5,080,465 A * | 1/1992 | Laude | G02B 5/1866 216/24 |
| 6,236,511 B1 | 5/2001 | Brown | |
| 6,353,503 B1 | 3/2002 | Spitzer et al. | |
| 6,671,100 B1 * | 12/2003 | McRuer | 359/630 |
| 7,907,343 B2 * | 3/2011 | Lee | G02B 5/045 359/621 |
| 2002/0186179 A1 | 12/2002 | Knowles | |

(Continued)

FOREIGN PATENT DOCUMENTS

JP         2002287077 A       10/2002

*Primary Examiner* — Mohammed Hasan
*Assistant Examiner* — Mustak Choudhury
(74) *Attorney, Agent, or Firm* — Lowe Graham Jones PLLC

(57) ABSTRACT

An optical device comprising an optical grating structure embedded between media of substantially the same optical refractive index, the structure having an optical coating at the interface between the two media, wherein the structure comprises grating facets inclined relative to the interface plane such that, in use, anomalous optical effects due to coating are substantially reduced.

13 Claims, 8 Drawing Sheets

(56) References Cited

U.S. PATENT DOCUMENTS

2009/0147362 A1* 6/2009 Saito .................... G02B 5/1876
359/574

* cited by examiner

EMBEDDED GRATING STRUCTURE

PRIORITY CLAIM

This application is a §371 National Stage Application of International Application No. PCT/GB2011/000551, filed Apr. 8, 2011, and entitled "EMBEDDED GRATING STRUCTURE," which is an International Stage Filing of GB Application No. 1005964.0, filed Apr. 9, 2010, and entitled "EMBEDDED GRATING STRUCTURE." Accordingly, the present application claims priority to and the benefit of the filing dates of International Application No. PCT/GB2011/000551, and GB Application No. 1005964.0, which are incorporated herein by reference in their entireties.

The present invention relates to structures embedded within an optical device.

Embedded structures have been known for many years as capable of redirecting light within a spectacle lens. Consequently, embedded structures have been recognised as being useful for augmented reality applications where it is important that the spectacles look like conventional spectacles to a casual observer.

An example of such structure is disclosed by JP2002287077, wherein a grating element embedded within the lens redirects the light from the side of the lens (frame leg region) into the eye, perpendicular to the pupil. Therefore this system allows reflection of the light from the grating. However, a problem with existing grating structures embedded in spectacle lenses such as the structure of JP2002287077 is that they are visible to the casual observer.

Furthermore, unless further correction to the front surface of the lens is employed, the grating disclosed in JP2002287077 disturbs a through-image. Although not taught or remotely suggested by JP2002287077, this disturbance could be avoided if the refractive indices either side of the grating were matched. However, matching the refractive indices either side of the grating would prevent the reflection of light from the grating to the eye.

To promote reflectance, the grating structure may be coated. For example, U.S. Pat. No. 6,353,503 discloses a coating at the interface of two optical surfaces within the lens that reflects specific light wavelengths, so that single colors or multiple colors may be observed in reflectance. However, the interface of the U.S. Pat. No. 6,353,503 system is a single curvature, rather than a grating structure as described in JP2002287077.

Accordingly, there is a need for an improved embedded grating structure capable of redirecting light within a lens in an unobtrusive manner. In particular, there is a need for an embedded grating structure which is substantially invisible to the casual observer of someone who is wearing spectacles containing the grating structure embedded in the spectacle lens. At the same time, the embedded grating structure should allow for non-disturbed through images, minimising anomalous optical effects.

According to the present invention there is provided an optical device comprising an optical grating structure embedded between media of substantially the same optical refractive index, the structure having an optical coating at the interface between the two media, wherein the structure comprises grating facets inclined relative to the interface plane 103 such that, in use, anomalous optical effects due to coating are substantially reduced.

According to the present invention there is also provided a method of displaying images, the method including the steps of:

Providing an optical device comprising an optical grating structure and embedded between media of substantially the same optical refractive index, the structure having an optical coating at the interface between the two media, wherein the structure comprises grating facets inclined relative to the interface plane 103 such that, in use, anomalous effects due to coating are substantially reduced.

providing a projector and a color filter positioned between the projector and the optical device; and projecting images from the projector onto the grating structure so that they can be viewed by a user viewing the system.

According to the present invention the coating on the surface of the grating does not cause substantial visible optical effects to the casual observer. Furthermore, the grating is shaped to correct for astigmatism of light passing through the back surface of a spectacle lens, therefore providing further optical functionality (such as image magnification or focussing) in combination with the projection optics.

Employing grating walls inclined with respect to the plane of the interface between the two media between which the grating is embedded (non-vertical grating walls) offers the following advantages:

Firstly, the surface quality of a manufactured non-vertical grating wall is higher compared to a grating wall perpendicular to the interface plane 103 (vertical grating wall). Therefore, the wall surface is smoother and the reflectance properties more well behaved (ie there is less specular reflectance causing unwanted observable effects).

Secondly, the coating thickness of the non-vertical grating wall is easier to increase, thus the performance is likely to be closer to the active area of the grating surface, thereby causing less observable effects.

Furthermore, the angles for which there is some observable anomalous optical behaviour can be designed such that they only occur to the side of the observed wearer (rather than straight on as is the case with vertical walls).

A further advantage of the present structure is that the grating walls do not need to be straight and therefore may be curved. Rounding the edges of the grating serves to further reduce anomalous grating reflectances due to potential roughness along machining edges.

The same angles can be used in both parts of the grating (active surface 101 and return surface 102) to produce a symmetrical grating structure. If the grating is near the pupil plane of the imaging system and the angles are such that light from the return surface 102 are directed away from the eye, then the main reduction in performance will be the amplitude of the image observed in reflectance.

Therefore the main advantages of having non-vertical walls are better coating quality and the ability to move the angles for which there are observable optical anomalies to relatively unimportant angles, to the side of the observed wearer. By employing similar active and return angles, the optical performance of the coating becomes similar and the grating becomes more difficult to observe.

The present invention will now be described with reference to the accompanying drawings in which.

Figure 1:
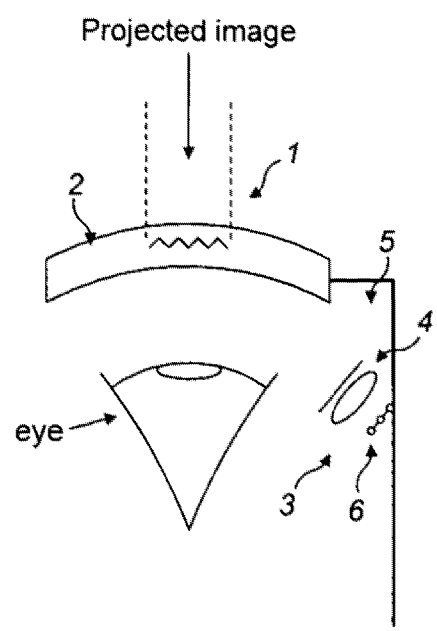
FIG. 1 shows an embedded grating structure for use in spectacles according to the present invention.

An example of an embedded grating for use in spectacles according to the present invention is shown in FIG. 1. A selective reflective structure 1 is integrated into or fixed to the back of a lens 2 such as an ophthalmic lens. To enable a grating structure 1 to be substantially hidden from the casual observer, it is necessary for the refractive indices either side of the grating to match so that no distortion is seen at non-perpendicular viewing angles.

A projector assembly 3 may be fixed to or integrated into the spectacles frame to project images onto the reflective structure 1 such that the images are reflected towards the user's eye. In this assembly, the projected image appears to a user's eye at a comfortable viewing distance.

The projector assembly 3 comprises a pixel matrix 6 which may be formed for example by a light-emitting diode (LED) array, an OLED array, a backlit liquid crystal display (LCD) or a switched/scanned beam. A projector lens 4 may be employed within the projector assembly 3, between the pixel matrix 6 and the reflecting structure 1, to provide focusing power. A narrow band filter 5 may be placed between the light source 4 and the reflecting structure 1, to filter the projected image before it reaches the reflecting structure 1. This combination of filtered light incident on the grating with an optical coating enables the filtered light to be reflected from the coating with almost none being transmitted thus further enabling the spectacles to appear unremarkable.

Figure 2:
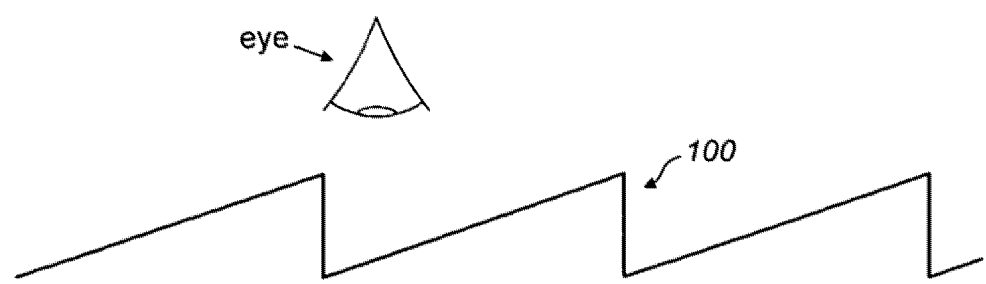
FIG. 2 shows a conventional Fresnel lens structure with near-vertical wall edges.

FIG. 2 shows a conventional Fresnel grating structure. The return of the profile to the baseline occurs over a small distance along the lens profile to maintain the efficiency of the lens, thereby creating substantially vertical edges 100. This arrangement therefore contains structures that are substantially along the line of sight to the user and a head-on observer.

Figure 3:
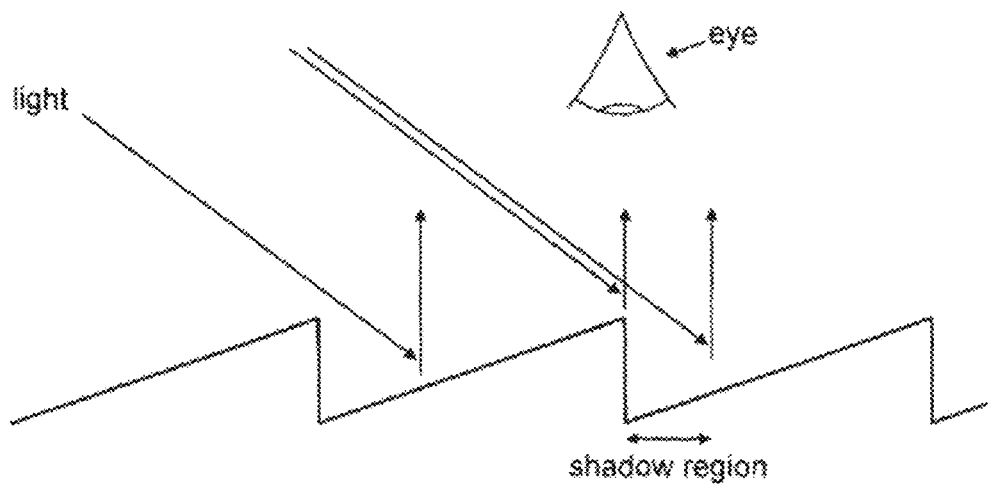
FIG. 3 shows a Fresnel structure used to redirect light from a side angle.

In the case of a Fresnel structure used to redirect light from a side angle, not all the surface of the Fresnel structure is used. This off axis imaging creates a 'shadow' region, as shown in FIG. 3.

Figure 4:
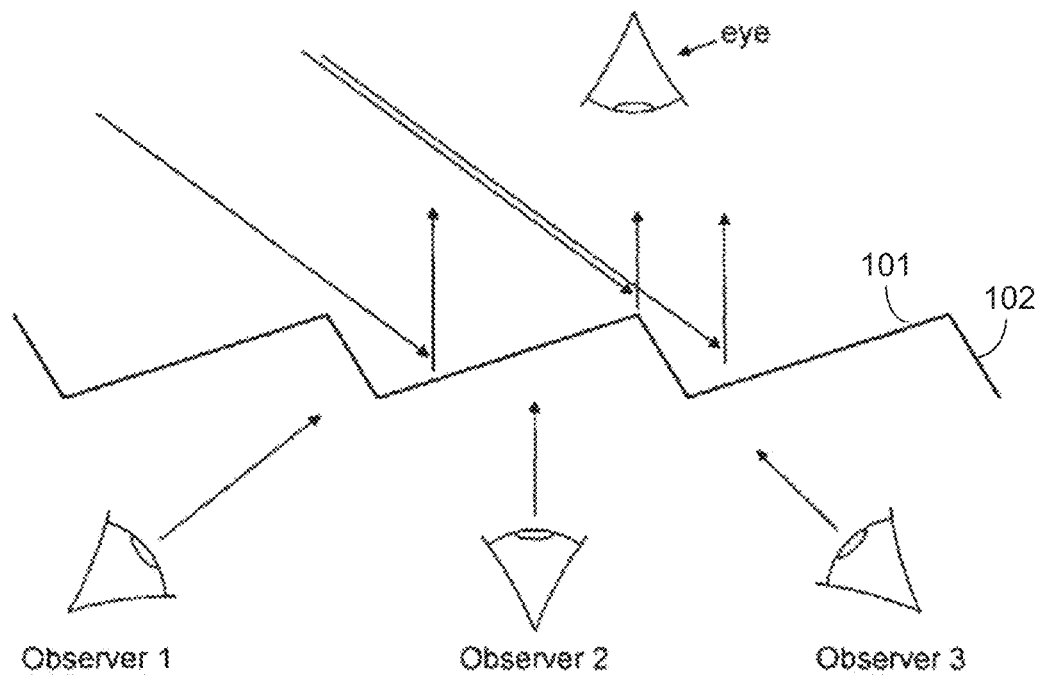
FIG. 4 shows an embedded grating structure according to the present invention.

The problem of anomalous optical effects due to the coating on the grating can be made substantially smaller by employing walls 200 of the grating which are not vertical, as shown in FIG. 4.

In contrast to the conventional structure of FIG. 2, off axis imaging using non-vertical walls 200 as represented in FIG. 4, leads to no change to projected image quality. An example range of angles is between 0° and 70°.

In FIG. 4, Observers 1 and 2 are expected to see the grating with no anomalous behaviour, whereas Observer 3 is expected to see some anomalous behaviour from the return surface 102, but only from a small range of angles to one side of the spectacle wearer. For most casual viewing directions from an observer towards a person wearing the spectacles, the grating according to the present invention is substantially invisible.

Employing individual tilt angles and surface profiles may be used to provide focus, magnification, astigmatism compensation, or other optical aberration compensation for use in combination with other optics in the system.

The non-vertical walls 200 may be curved to substantially reduce the apparent optical anomalous behaviour of an optical coating on a grating surface. The anomalous behaviour is reduced by promoting more equal coating properties or moving the angle of the observable effect to an angle where it is unlikely to be conspicuous to the casual observer.

The optical coating is designed to reflect specific bands or multiple bands of visible or near-visible light, and/or the image source is passed through a color filter such that the user sees nearly 100% of the reflected light at the appropriate wavelengths, and the transmission of these wavelengths is near zero so that an observer is not generally aware of them. The bands of reflected light may be towards the red or the blue end of the spectrum such that the optical device looks substantially colorless, or there may be multiple bands of light such that the optical device looks substantially colorless but with a reduced average transmission.

THE same angles can be used in both parts of the grating (active surface 101 and return surface 102) to produce a symmetrical grating structure. If the grating is near the pupil plane of the imaging system and the angles are such that light from the return surface are directed away from the eye, then the main reduction in performance will be the amplitude of the image observed in reflectance. Therefore, by making the active and return angles more similar the optical performance of the coating becomes similar and the grating becomes more difficult to observe.

Figure 5:
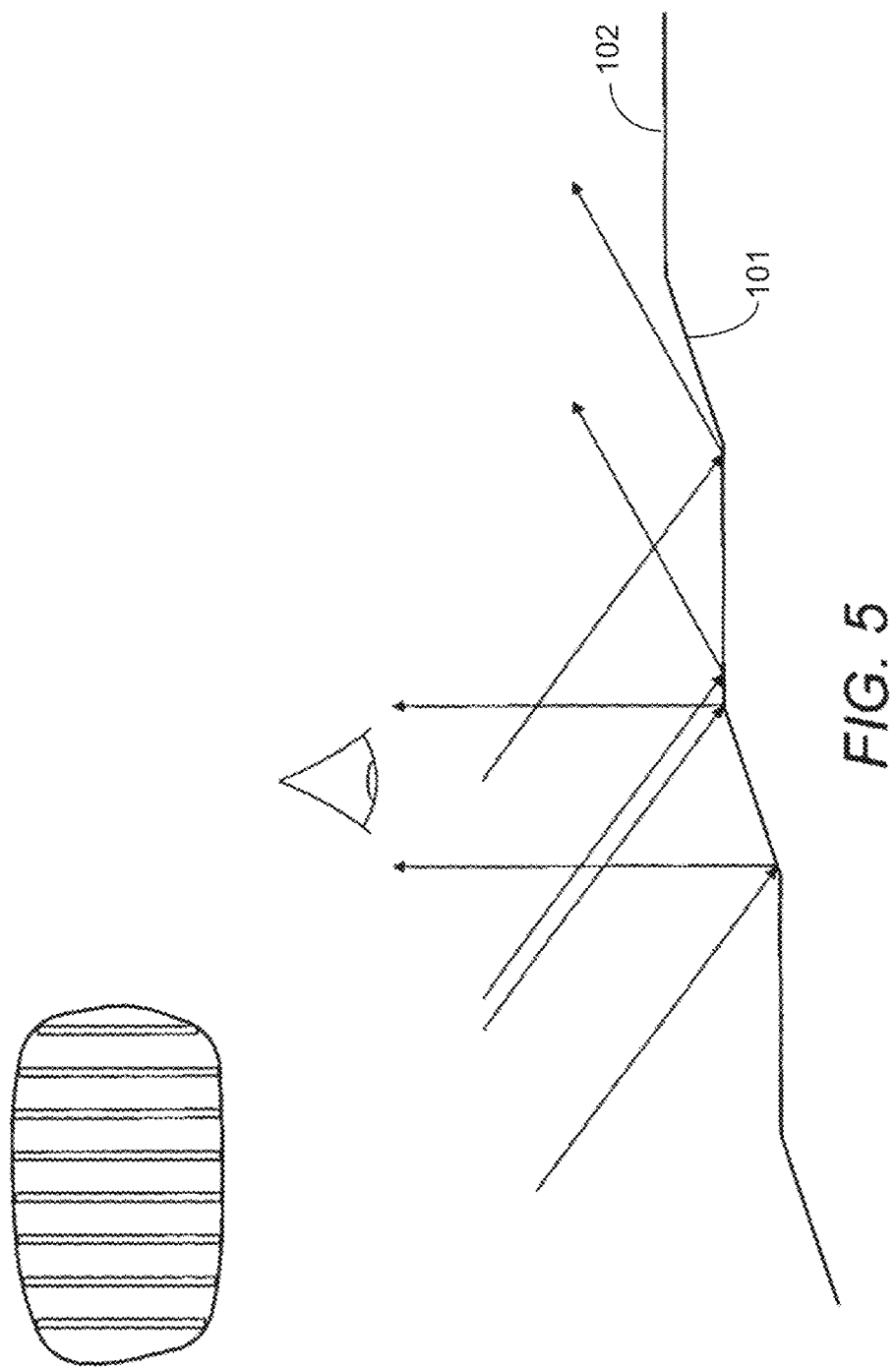
FIG. 5 shows an embedded grating structure according to the present invention with zero return angle.

By making the return angle of the grating smaller than the nominal grating angle one can further reduce the visibility of the grating by effectively reducing the surface area of the grating and thus its visibility. In the extreme case one could envisage a grating with a zero return angle, as shown in FIG. 5. In this case there appears a flat region between the active grating structures, making the grating appear as a 'sparse' grating. This should not significantly affect the image quality if the grating structure is substantially in the pupil plane, although there will be a reduction in the intensity of the reflected image (unless measures are taken to project the image via the active grating regions only). There should be several grating structures visible through the viewer's pupil at any suitable viewing angle so that there is insignificant variation in amplitude of the reflected light as the eye points in different directions. The depth of the grating structure will monotonically increase in this example, however for typical conditions this may not be a significant limitation. For example, a grating structure that has an angle of 14° and width of grating element of 333 μm has a grating depth of 83 μm. If there is 666 μm gap between grating structures then the overall structure height will increase by 83 μm per mm. For a 30 mm wide viewing area in a lens the total grating height is 2.5 mm, a thickness which would be acceptable in a commercial pair of spectacles.

Figure 6:
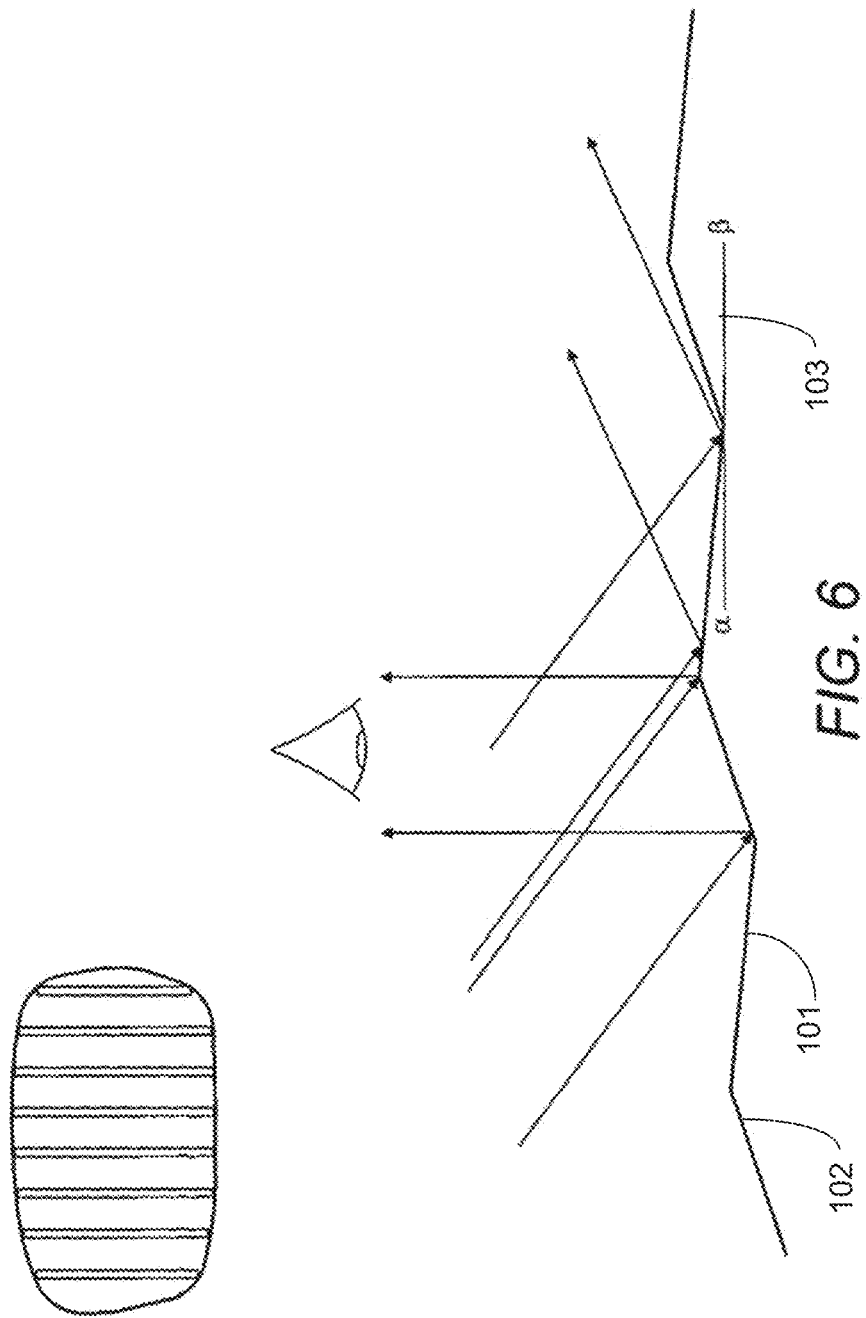
FIG. 6 shows an embedded grating structure according to the present invention with a smaller return angle than the angle of the grating, in which the grating does not return to the same height after each grating structure period.
Figure 7:
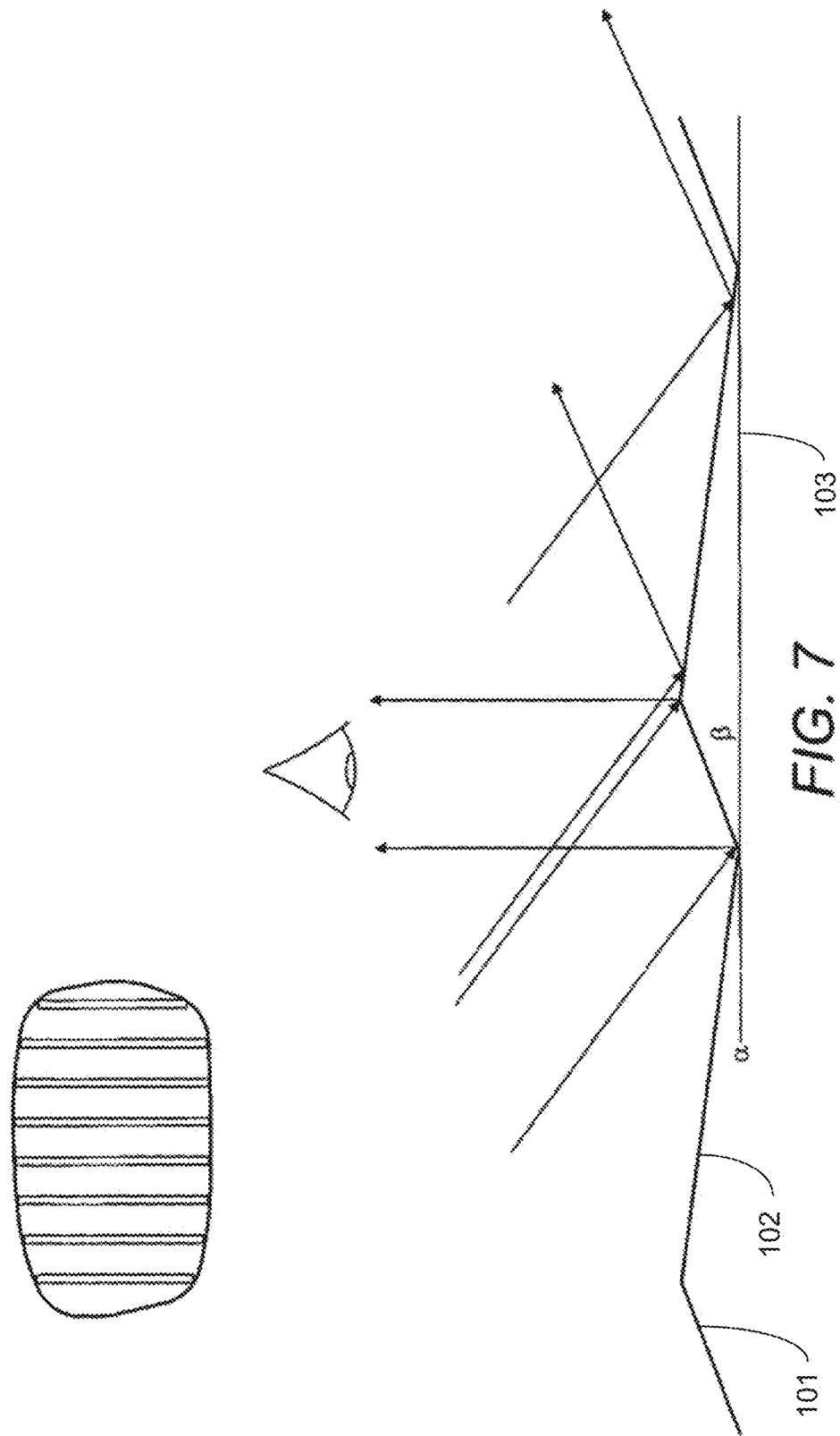
FIG. 7 shows an embedded grating structure according to the present invention with a smaller return angle than the angle of the grating, in which the grating returns to the same height after each grating structure period.

To reduce this thickness further (if required) then a small return angle can be chosen, which partially returns the depth of the grating to the original height (see FIG. 6) or fully returns the depth of the grating to the original height (see FIG. 7). In addition, the spare grating concept can be used on a curved interface where the grating baseline follows the curvature.

Figure 8:
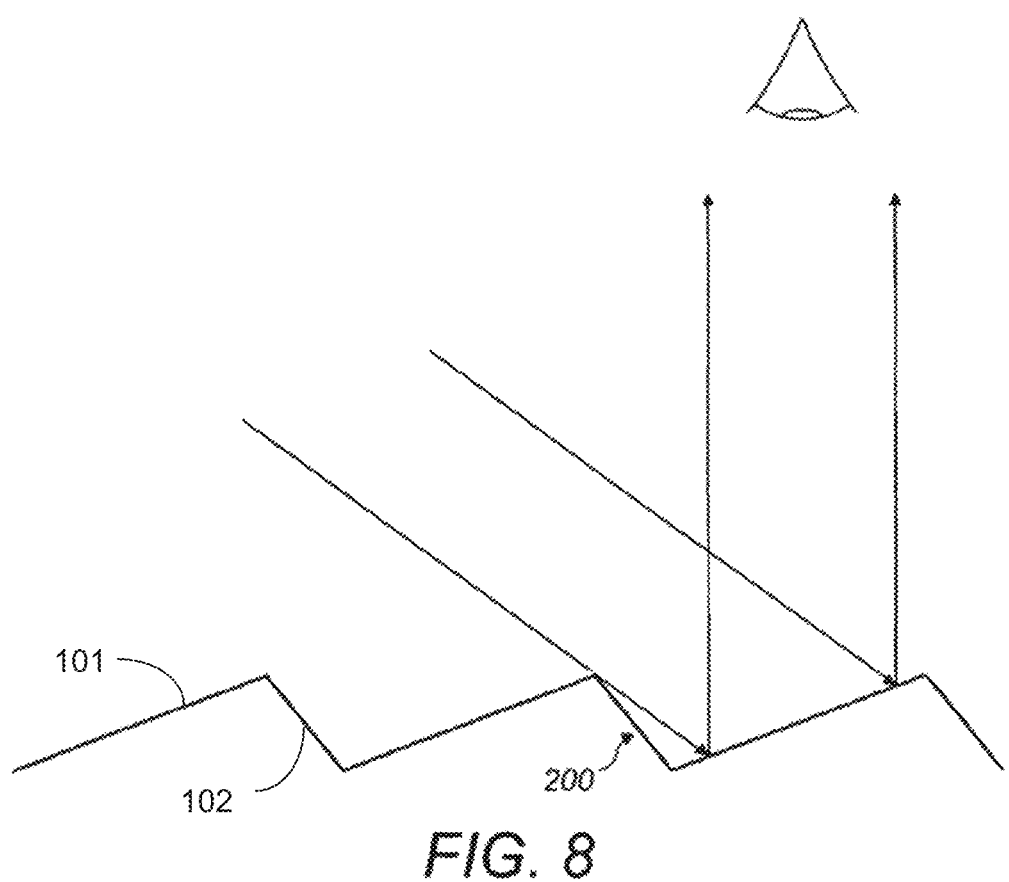
FIGS. 8 to 9 show three example gratings with different grating angles to provide different technical advantages.
Figure 9:
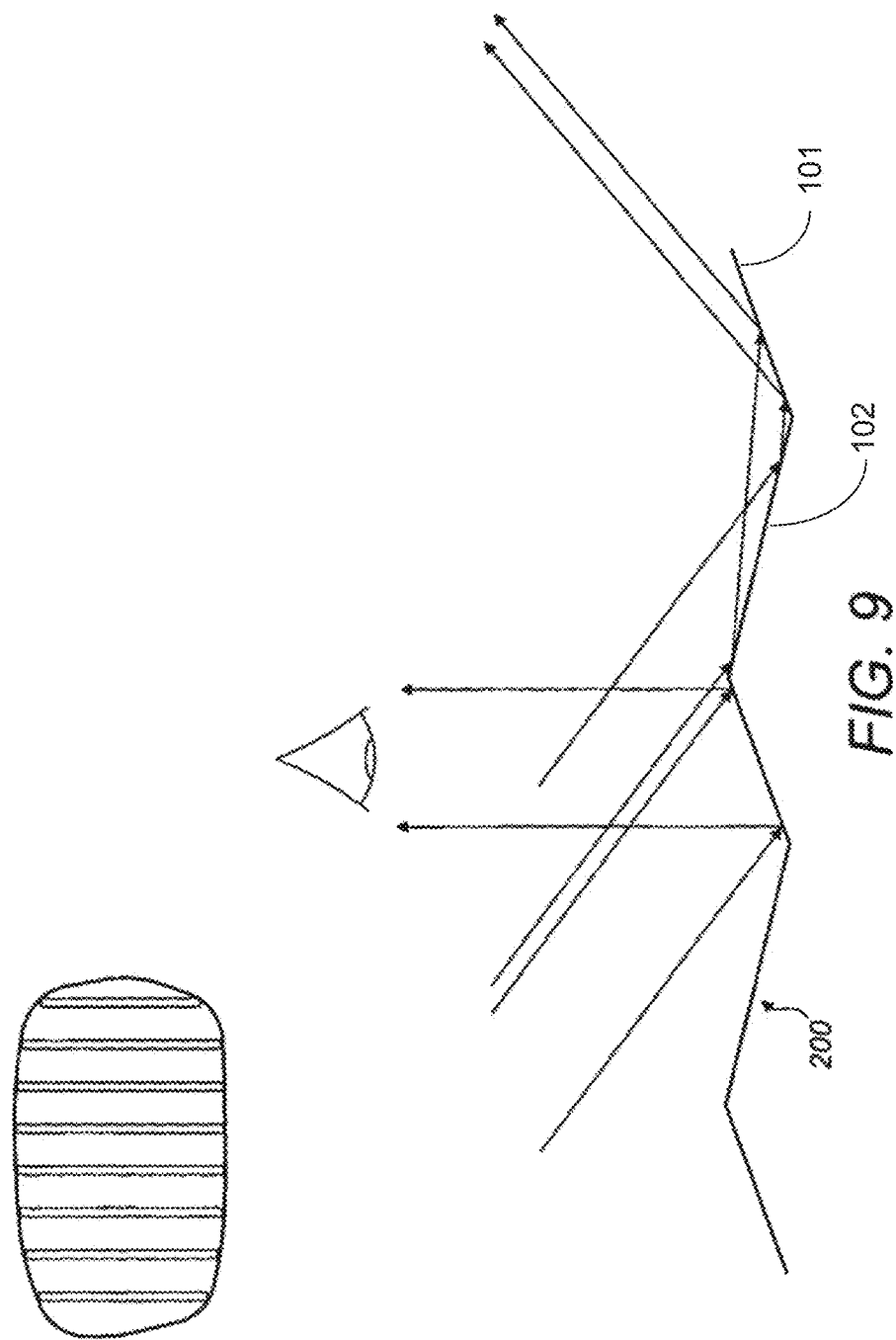

FIGS. 8 through 9 show configurations in which the incoming angle of received light is 45° into the optical structure, the glass or other material, through refraction, altering the angle to 28° to the normal. Each of these figures then show a different grating structure with different effect.

In FIG. 8 the grating angles are chosen such that the return edge 200 of the grating does not receive any incoming light. This arrangement has, in this example, a return angle for the grating in the range from 90° to 62°. At the 62° angle there will be grazing incidents of light on the return walls.

FIG. 9 shows another configuration in which the return angle range is 62° to 24° with the incoming light reflecting off the return wall and at least partially hinting the grating, which in this example is at 14°.

Figure 10:
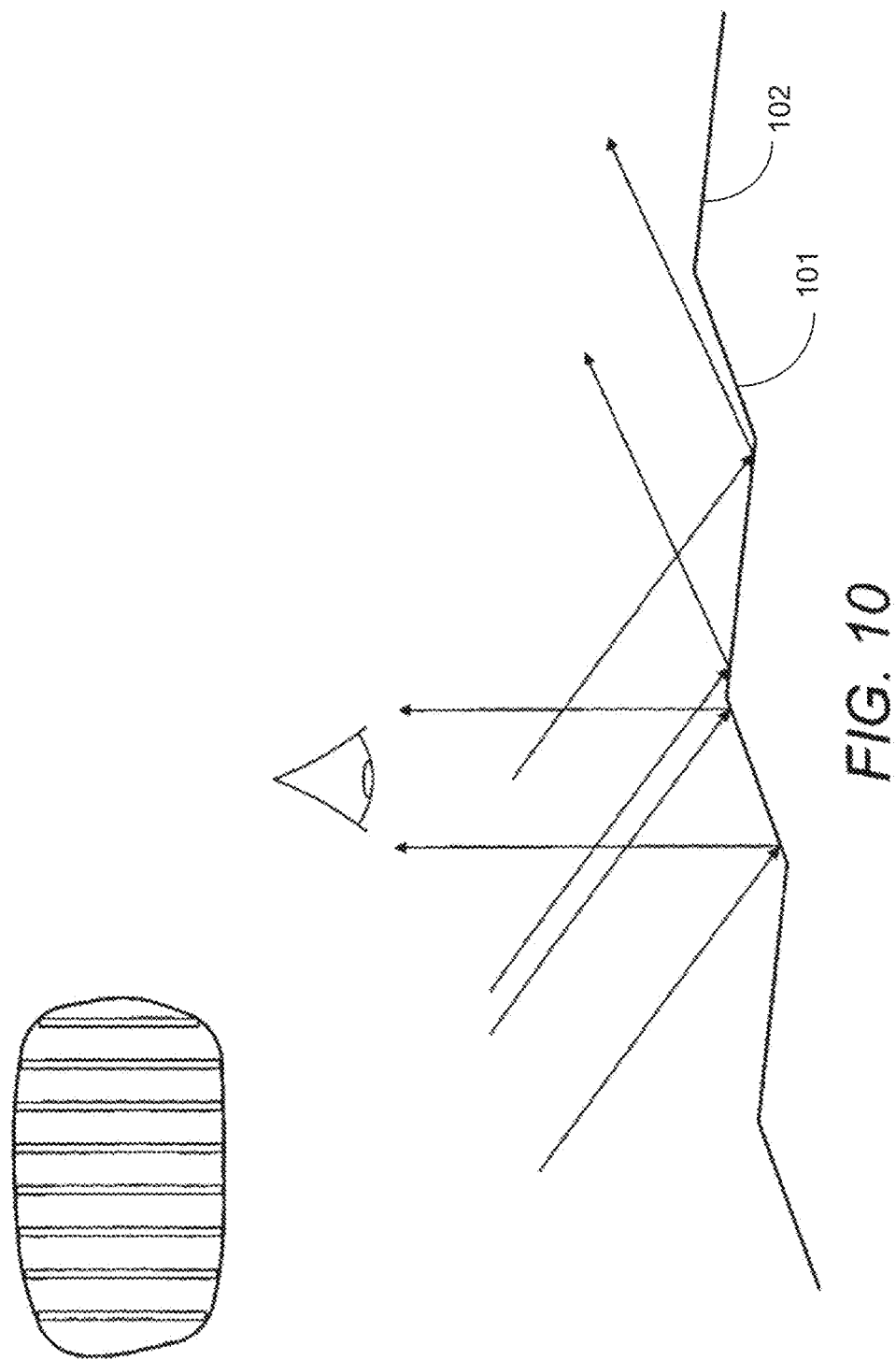

FIG. 10 shows a return angle from 24° to 0° which provides a structure in which incoming light reflects off the return wall and does not hit the grating, then reflecting off outside of the user's field of view.

The configurations shown in FIGS. 8 through 10 provide different functionalities for different types of device. In the arrangement of FIG. 8 there is no loss in the abstitute of light, but there is the possibility that the grating will be more visible. In the arrangement of FIG. 9 the coating of the grating can be designed to employ the grating instance angles to the appropriate effect, but may have some amplitude loss for the light. The example of FIG. 10 will, it will be appreciated, to have greater amplitude loss, but will have low visibility for the grating as the instance angles of it are small.

The grating itself is shaped to correct for astigmatism of light coming as it passes through the back surface of spectacle lens, and provides other optical functionality (such as magnification/focussing) in combination with the optics after the image source. In the case of spectacles with flat lenses, or where the surface closest to the eye is flat, the issues of astigmatism due to curved incident surface are much reduced and the design and manufacturing of the lenses becomes easier.

In addition to the wearer viewing projected images, a small camera could be embedded in the spectacle frames to image the wearer's pupil in real time via the grating structure, enabling non-invasive eye tracking (in both eyes if required). This could enable interactions between the displayed image and the wearer via their pupil positions and an activating action—such as a hard blink or other indicative action.

The grating can be manufactured by diamond fly cutting or diamond ruling a master, which can in turn be replicated to produce sub-masters, with which casting, embossing or injection molding can be used to produce the grating in an appropriate material. In particular, co-molding the lens after coating with the same material as the grating is made with would substantially assist in matching refractive indices.

Applications for this system include, but are not limited to, implementing augmented reality spectacles. Applications of augmented reality spectacles which could use this technology include the following.

One is a consumer application for viewing text, such as emails, documents, text messages, video etc. The information could be loaded and transmitted to the spectacles using another device such as a computer or mobile phone. This could be a way of generating virtual e-books, where text is displayed for the viewer without the need for a read e-book.

Consumer applications for real time product pricing, if a camera is attached with appropriate color filters to view through the glasses.

Consumer applications for real time GPS and navigation, or tracking of position for exercise applications, for example.

Surgical applications whereby the surgeon can see patient information such as blood pressure and heart rate projected via these spectacles. Other information can be superimposed on the patient in real time using eye tracking and head tracking cameras, such as MRI/CAT/PET scans, tissue type or condition via hyperspectral imaging/seeing through blood via hyperspectral imaging.

Military applications for superimposing maps into the field of view in real time so that physically looking at a map using a torch, thus potentially giving away their position, is not required. Night vision, using a head-mounted night vision camera which is then video fed into the spectacles. Significantly, the wavelength that is projected could be in the near infra-red where the light is visible to the eye, but is too far in the infra-red to disrupt night vision (astronomers use this technique to avoid disrupting their night vision). This also includes multiple applications of displaying information to the soldier in real time, including 360° vision.

3D gaming whereby fully 3D volumetric spectacles can be fabricated using a sufficiently fast multi-focal lens to display virtual 2D slices of the environment at different focal lengths away to simulate a fully immersive 3D environment.

Also, 3D TV using the same principle as 3D gaming glasses. This invention allows for lightweight spectacles that look very similar to conventional glasses (ie no polarisers) thereby increasing the acceptability of wearing glasses for 3D TV, whilst significantly improving the 3D experience.

Firemen could use these spectacles to superimpose infra red images to detect sources or lack of heat, or to use non-visible wavelengths such as infra-red to assist looking through smoke, thereby assisting navigation and helping to spot danger. This could also display maps of the building, or images from cameras dropped along the route through the building to monitor exit routes.

Use in environmental monitoring for thermal sources or chemicals using the output of cameras or spectroscopy to provide the user with a real-time superimposed image of sources of environmental information.

As mentioned above one example application for an embedded grating structure according to the present invention is described.

Conventional 3D spectacles/goggles project 2D images of two different viewpoints into the eyes of the observer to recreate a binocular effect. This technique is used in 3D cinema, typically using two images of different polarisation reflected from the screen and passing through polarisers provided in the spectacles. Therefore the 3D spectacles serve to pass the correct images to each eye.

Such systems however suffer from the major drawback that users find it a strain to use the spectacles for long periods of time. This is because the users' eyes perceive the depth information from the relative displacements of the two images, and point their eyes towards the point in space where the two images converge or the vergence distance. However, to produce a sharp image the user must focus at the position of the screen (the focal distance), which is almost always different from the position of the apparent image. Thus the direction of the eyes and the focussing of the eyes are in conflict, which can cause nausea or headache.

Furthermore, the use of polarising spectacles is undesirable because of the reduction in light throughput of at least 50%, whereas conventional spectacles are above 90% transmissive. Projecting 2D images into the eye has so far been achieved in relatively bulky optical arrangements (which are more accurately called goggles), and suffer from the same problems of two 2D images representing a 3D environment.

A solution to the problem of the conflict between vergence and focus distances is to present a virtual environment to the user where the objects in the images exist at the correct depths. This can be achieved by a volumetric display, where a 3D environment is sliced up into depth planes of 2D information which is presented to the user at the correct virtual distance at a fast enough rate so as not to notice the sequence of images.

To present a number of 2D images at the correct distance to make a 3D volumetric display one needs to rapidly change the focal position of the object. This can be done in a variety of ways, including moving projection lenses, moving the source image, deformable mirrors etc. However, the speeds of movement (typically above 100 Hz, ideally above 200 Hz) lead to vibrating masses at such rates being difficult to implement.

Using a high speed multi-switchable solid state lens may be used to overcome these limitations. Furthermore, combining the invisible grating structure according to the present invention with a compact high-speed switchable lens is highly useful in providing a means of constructing a solid-state spectacle lens with 2D and true 3D augmented reality functionality within the size and form constraints conventionally found in commercial spectacle lenses.

The invention claimed is:

1. An optical device comprising an optical single grating structure embedded between media of a lens of wearable eye glasses, wherein media of the lens are made with substantially the same optical refractive index, wherein the structure has a reflective optical coating at the interface between the two media, wherein the single grating structure comprises a plurality of segmented elements joined at intersecting edges, wherein the single grating structure has at least a first segmented element that is defined by a first surface part for reflecting incoming light and a second surface part for returning an intersecting edge of the second surface part to a corresponding intersecting edge of the first surface part of an adjacent second segmented element, wherein the second surface part is inclined relative to the interface plane at angles between 14° and 70° such that, when incoming light is reflected from the second surface part, a reduction in anomalous optical effects due to coating the second surface part reduces visibility to a casual observer of the grating structure embedded in the wearable eye glasses worn by a user.

2. An optical device according to claim 1, wherein the second surface is curved.

3. An optical device according to claim 2, wherein the optical coating reflects visible or near-visible light.

4. An optical device according to claim 2, wherein the optical coating reflects visible or near-visible light, and wherein the optical coating reflects substantially red light.

5. An optical device according to claim 2, wherein the optical coating reflects visible or near-visible light, and wherein the optical coating reflects substantially blue light.

6. An optical device according to claim 1, wherein the optical coating reflects visible or near-visible light.

7. An optical device according to claim 6, wherein the optical coating reflects substantially red light.

8. An optical device according to claim 6, wherein the optical coating reflects substantially blue light.

9. A system comprising
an optical device according to any preceding claim;
a projector arranged in use to project images on the structure; and
a color filter positioned between the projector and the grating structure.

10. The system according to claim 9, wherein the optical device, the projector, and the color filter are components of a spectacle.

11. An optical device according to claim 1, wherein the optical coating reflects visible or near-visible light, and wherein the optical coating reflects substantially red light.

12. An optical device according to claim 1, wherein the optical coating reflects visible or near-visible light, and wherein the optical coating reflects substantially blue light.

13. A method of displaying images, the method including the steps of:
providing an optical device comprising an optical single grating structure and embedded between media of a lens of wearable eye glasses, wherein the media of the lens has substantially the same optical refractive index, the single grating structure has a reflective optical coating at the interface between the two media, wherein the single grating structure comprises a plurality of segmented elements joined at intersecting edges, wherein the single grating structure has at least a first segmented element that is defined by a first surface part for reflecting incoming light and a second surface part for returning an intersecting edge of the second surface part to a corresponding intersecting edge of the first surface part of an adjacent second segmented element;
providing a projector and a color filter positioned between the projector and the optical device; and
projecting images from the projector onto the structure so that they can be viewed by a user viewing the system, wherein the second surface part is inclined relative to the interface plane at angles between 14° and 70° such that, when incoming light is reflected from the second surface part, a reduction in anomalous optical effects due to coating the second surface part are reduces visibility to a casual observer of the grating structure embedded in the wearable eye glasses worn by a user.

* * * * *